United States Patent
Selvaraj et al.

(10) Patent No.: US 10,013,660 B2
(45) Date of Patent: Jul. 3, 2018

(54) METHOD AND CONTROL SYSTEM FOR SCHEDULING LOAD OF A POWER PLANT

(75) Inventors: Gopinath Selvaraj, Madurai (IN); Senthil Kumar Sundaram, Bangalore (IN); Mohan Kumar Shanmugam, Chennai (IN); Shrikant Bhat, Nagpur (IN)

(73) Assignee: ABB Research Ltd, Zurich (CH)

( * ) Notice: Subject to any disclaimer, the term of this patent is extended or adjusted under 35 U.S.C. 154(b) by 778 days.

(21) Appl. No.: 13/539,773

(22) Filed: Jul. 2, 2012

(65) Prior Publication Data

US 2013/0006439 A1 Jan. 3, 2013

Related U.S. Application Data

(63) Continuation of application No. PCT/IB2010/001106, filed on May 13, 2010.

(30) Foreign Application Priority Data

Dec. 31, 2009 (IN) .......................... 3244/CHE/2009

(51) Int. Cl.
*G06F 1/26* (2006.01)
*G06Q 10/06* (2012.01)
*G06Q 50/06* (2012.01)

(52) U.S. Cl.
CPC ............. *G06Q 10/06* (2013.01); *G06Q 50/06* (2013.01); *Y02E 40/76* (2013.01); *Y04S 10/54* (2013.01); *Y04S 10/545* (2013.01)

(58) Field of Classification Search
CPC ....... Y04S 10/54; Y04S 10/545; G06Q 10/06; G06Q 50/06; Y02E 40/76

(Continued)

(56) References Cited

U.S. PATENT DOCUMENTS 6,278,899 B1 8/2001 Piche et al.
6,671,634 B2 * 12/2003 Koutlev ................ G05B 17/02
324/537

(Continued)

FOREIGN PATENT DOCUMENTS

CN 1866286 A 11/2006
JP 200233054 A 11/2002
JP 2007293889 A 11/2007

OTHER PUBLICATIONS

Fu et al., "Load scheduling and Health Management of Electric Power Generation Systems" May 8, 2002 Proceeding of the American Control Conference.*

(Continued)

*Primary Examiner* — Charles Kasenge
(74) *Attorney, Agent, or Firm* — Barnes & Thornburg LLP

(57) ABSTRACT

A method and control system are disclosed for optimizing load scheduling for a power plant having one or more generation units. The method can include analyzing the operating state of one or more components of generation units in terms of one or more risk indices associated with one or more components of generation units; updating an objective function that reflects the state of one or more components of generation units; solving the objective function to optimize a schedule of the one or more generation units and operating state of one or more components of generation units; and operating the one or more generation units at optimized schedule and operating state.

9 Claims, 5 Drawing Sheets

(58) Field of Classification Search
USPC .......................................................... 700/297
See application file for complete search history.

(56) References Cited

U.S. PATENT DOCUMENTS

| | | | | | |
|---|---|---|---|---|---|
| 6,691,065 | B2* | 2/2004 | Hayashi | ............... | G05F 1/66 340/286.01 |
| 6,853,930 | B2* | 2/2005 | Hayashi | ............... | G05F 1/66 340/855.8 |
| 6,907,381 | B2* | 6/2005 | Hayashi | ............... | G05F 1/66 60/403 |
| 6,999,829 | B2 | 2/2006 | Bazzocchi et al. | | |
| 7,065,472 | B2* | 6/2006 | Hayashi | ............... | G05F 1/66 340/286.01 |
| 7,203,622 | B2* | 4/2007 | Pan | ............... | G06Q 10/06 702/184 |
| 7,272,516 | B2* | 9/2007 | Wang | ............... | H02J 3/00 702/60 |
| 7,945,524 | B2* | 5/2011 | Anderson | ............ | G06N 99/005 706/12 |
| 8,606,548 | B2* | 12/2013 | Webster | ............... | G06Q 10/06 703/1 |
| 2002/0116139 | A1* | 8/2002 | Przydatek | ............ | G01D 4/004 702/62 |
| 2002/0120412 | A1* | 8/2002 | Hayashi | ............... | G05F 1/66 702/61 |
| 2003/0004659 | A1* | 1/2003 | Hayashi | ............... | G05F 1/66 702/60 |
| 2003/0130755 | A1 | 7/2003 | Bazzocchi et al. | | |
| 2004/0148132 | A1* | 7/2004 | Hayashi | ............... | G05F 1/66 702/184 |
| 2004/0158772 | A1* | 8/2004 | Pan | ............... | G06Q 10/06 714/14 |
| 2004/0181369 | A1* | 9/2004 | Hayashi | ............... | G05F 1/66 702/184 |
| 2006/0143037 | A1* | 6/2006 | Artiguenave et al. | ............ | 705/1 |
| 2006/0253268 | A1* | 11/2006 | Antoine | ............... | G06Q 10/063 702/184 |
| 2007/0168057 | A1* | 7/2007 | Blevins et al. | ................ | 700/53 |
| 2009/0157573 | A1* | 6/2009 | Anderson | ............ | G06N 99/005 706/12 |
| 2009/0204234 | A1* | 8/2009 | Sustaeta et al. | ................ | 700/29 |
| 2011/0066298 | A1* | 3/2011 | Francino | ................ | F01K 9/003 700/290 |
| 2011/0224953 | A1* | 9/2011 | Webster | ................ | G06Q 10/06 703/1 |

OTHER PUBLICATIONS

International Search Report (PCT/ISA/210) dated Oct. 4, 2010, by the European Patent Office as the International Searching Authority for International Application No. PCT/IB2010/001106.
P. Kallappa et al., "Simulation of a Load Dispatch Control System," Proceedings of the 1999 American Control Conference, Jun. 1999, 1744-48.

* cited by examiner

METHOD AND CONTROL SYSTEM FOR SCHEDULING LOAD OF A POWER PLANT

RELATED APPLICATION

This application claims priority as a continuation application under 35 U.S.C. § 120 to PCT/IP2010/001106, which was filed as an International Application on May 13, 2010, designating the U.S., and which claims priority to Indian Application 3244/CHE/2009 filed in India on Dec. 31, 2009. The entire contents of these applications are hereby incorporated by reference in their entireties.

FIELD

The present disclosure relates to scheduling in power plants, such as scheduling a load of a power plant.

BACKGROUND

Optimization is a technique of controlling a process, so as to optimize a specified set of parameters without violating constraints of the process. Known optimization processes in a power plant are carried out to increase efficiency, lower possible emissions, reduce cost, and maximize system availability for power generation. There are several systems that may be optimized independently in the power plant for better performance. For example, upgrading a specific component of equipment in the power plant can result in less fuel consumption. Also, the overall operation of the power plant may be optimized, by optimizing one or more factors that contribute to overall efficiency of the power plant.

It is known to optimize load scheduling in the power plant to minimize operational cost, and known techniques exist for optimizing load scheduling. For example, load scheduling may be optimized based on a load demand (e.g., the power plants are scheduled in such a manner that the load demand is met). As another example, load scheduling may also be optimized to meet a predetermined maintenance schedule.

As one can easily see, the operation of load scheduling can have cost implications and the cost associated with load scheduling can be referred as "cost of load scheduling". The cost of load scheduling may be determined from the capital cost of the equipment, fuel cost, cost of chemicals, cost of spare equipment and parts, and maintenance cost. Apart from the capital cost and the fuel cost, the maintenance cost can be considered a significant expenditure for a power plant and a shift in the maintenance schedule may have significant change in the cost of load scheduling.

The maintenance schedule of equipment may be based on regular intervals, elapsed time, or run-time meter readings. Therefore, it is often desired to adapt to any unforeseen shift or preplanned shift in the maintenance schedule to minimize the cost. Moreover, overall operation cost of the power plant also can change due to the shift in the maintenance schedule. A maintenance schedule is based on downtime resulting from scheduled maintenance of power plant components and unplanned or forced shutdowns because of sudden failure and repair activity. It can be desirable to have planned and scheduled maintenance and avoid the unplanned maintenance. Therefore, maintenance activities are scheduled periodically and as frequent as possible either as recommended by the manufacturer or based on the operator's past experience.

Delaying the planned maintenance schedule may increase the unplanned maintenance and the associated cost. Advancement of the maintenance schedule may influence unnecessary maintenance activities and the maintenance costs. It is to be noted that there are multiple scheduling tools for scheduling production as well as maintenance but, this is often not based on the actual operating conditions and state of the component or operation under consideration.

The maintenance actions for the power plant components can be notified by corresponding maintenance triggers in the form of an electronic representation which are the inputs for such scheduling tools. As per the maintenance triggers, these tools will find the schedule for maintenance actions along with the production scheduling for the period of time. In such scheduling approaches, the optimization techniques used are, for example, only based on cost consideration and do not include actual operating conditions and state of the components.

With advent of advanced control systems and with increased computational power available with such control systems, more features are being included for optimization. In a control system, optimization may be carried out with an optimization module or a component that is already integrated with the control system or may be carried out separately based on the information available from the plant. However, it is common to find the former means (e.g., having the optimization module already embedded in the control system). In many cases, the optimization module utilizes a statistical or physics based model approach (first principle model) for evaluation of optimal settings. Other approaches such as that based on neural network or syntactic may also be practiced.

In case of load scheduling operation, the optimized output values are the various set points to the controllers controlling the plant. The provided set points are such that the plant in an overall sense functions to meet specifications (e.g., load demand, operation cost, efficiency, safety and regulatory specifications, maintenance specifications, etc.).

As already mentioned, in many cases, optimization is based on statistical or a first principle model based approach. In such approaches, essentially there is at least one mathematical expression that relates a property of the plant as a function of measured or estimated parameters of the plant. Some examples of a property of the plant are generator power output, boiler steam generation, fuel utilization, maintenance schedule, age or life expectancy of a particular unit in the plant, etc. The mathematical models used can be related to performance of individual units in the plant or for overall coordinated functioning of the plant. In many cases, performance includes cost functions or these may be derived by suitable formulation of an optimization problem.

On a specific aspect of load scheduling and influence of maintenance activity, one skilled in the art would recognize that it is common to find a predefined schedule prescribed for maintenance, though in practice maintenance activity may be an unforeseen activity carried out as a result of failure of one or several components in a power plant. As the cost of a power plant being unable for service is very high, the design of a power plant is made having sufficient redundancy and margins to withstand unusual loads or scenarios. In addition, there is adequate general knowledge or history present with the power plants about maintenance or service activities for the plant that one skilled in the art would recognize what kind of load or scenario is likely to cause failure of what component, and the associated cost and downtime as a consequence of the maintenance activity. This knowledge can be efficiently utilized for scheduling the load for the power plant and include a schedule for maintenance activity considering the state of the plant.

In light of the foregoing discussion, exemplary embodiments disclosed herein are directed to an efficient technique for scheduling the load for a power plant, and developing an optimization module present in the control system to take care of maintenance scheduling.

SUMMARY

A method is disclosed for optimizing load scheduling for a power plant having one or more generation units. The method comprises i) analyzing the operating state of one or more components of generation units having one or more risk indices associated with the one or more components of generation units; ii) updating at least one objective function that reflects the state of one or more components of generation units; iii) solving the objective function to optimize a schedule of the one or more generation units and operating state of one or more components of generation units; and iv) operating the one or more generation units at optimized schedule and operating state.

A control system is also disclosed for scheduling a load of a power plant having one or more generation units. The control system comprises an optimizer having at least one objective function for optimizing load scheduling which includes maintenance scheduling, and for optimally controlling processes of the one or more generation units. The optimizer utilizes a plant model component and a failure model component for load scheduling optimization.

DETAILED DESCRIPTION

Figure 1:
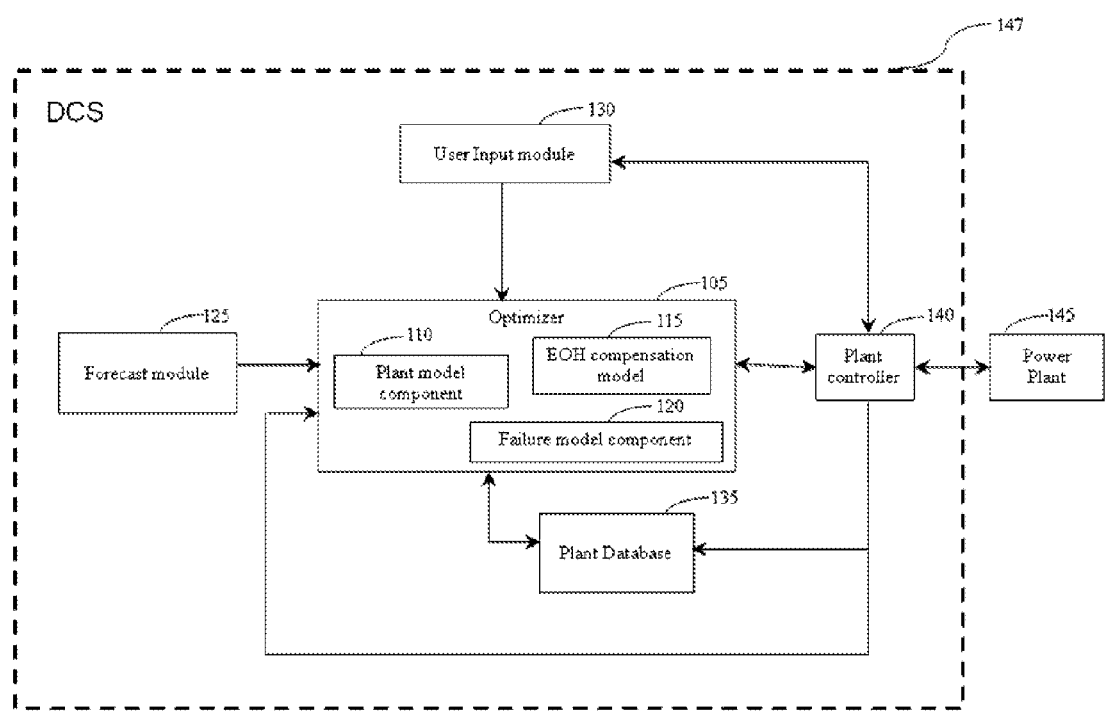
FIG. 1 is a block diagram of an exemplary system for scheduling a load of a power plant, in accordance with which various exemplary embodiments can be implemented.

It shall be observed that method and system components described in accordance with exemplary embodiments have been represented by known symbols in the figures, showing only specific details that are relevant for an understanding of the present disclosure. Further, details that are readily apparent to those skilled in the art may not have been disclosed.

Exemplary embodiments of the present disclosure provide a method and system for scheduling a load of a power plant.

According to an exemplary method, analyzing can include capability assessment and operational cost assessment in the prediction horizon. Optimizing load scheduling mentioned herein includes production scheduling, maintenance scheduling or load for one or more generation units or a combination thereof. The method can also include optimizing risk indices for one or more components of the one or more generation units. Optimizing the risk indices can be done by suitably changing the manipulated variables.

According to an exemplary aspect, a method can include postponing or advancing a maintenance trigger for maintenance of one or more components of one or more generation units, which is based on the state of a component or load demand. An objective function as referred to herein can include at least one term for process control of the one or more components of the one or more generation units and at least one term associated with maintenance of the one or more components of the one or more generation units. Updating can include updating the objective function with cost associated with postponing or advancing the maintenance of the one or more components of one or more generation units.

According to a further exemplary aspect of the system, the optimizer can comprise a scheduler analyzer for analyzing the operating state of one or more components of generation units having one or more risk indices associated with the one or more components of generation units. The optimizer can be capable of scheduling maintenance based on risk indices associated with the one or more components of one or more generation units or demand forecast or improvements in the operating state affected by new manipulated variables or prescheduled maintenance effected by a maintenance trigger or combinations thereof.

Power plants can be scheduled to produce power for a period of time/prediction horizon varying, for example, from days to weeks, termed as short term load scheduling. A production schedule of a power plant has been done on the basis of power/steam demand, availability of power plant components and the net revenue from production. The optimizer can use different cost factors which include a penalty for not meeting the demand, revenue of power sales, fuel consumption, emission reduction, components depreciation, startup and shutdown of components to load the power plant optimally. In addition to these cost factors the optimizer can also use the cost associated with the maintenance schedule of each component, assessed with consideration to the state of each component in terms of risk index, also referred as risk indices and EOH (Equivalent Operating Hour) compensation referenced with respect to its nominal functioning and life expectancy, to find optimal production, maintenance schedules and the operating conditions and achieve maximized revenue and efficiency.

In accordance with a first exemplary aspect, a method for scheduling load of a power plant by an optimizer includes receiving one or more inputs, the one or more inputs being associated with a plurality of constituents of the power plant. The method can include calculating a risk index of at least one of the constituents of the power plant responsive to the one or more inputs. The method can include determining a load based on the risk index, the load being associated with an output power of the power plant. The method can include operating the power plant based on the load.

FIG. 1 is a block diagram of a system for scheduling a load of a power plant, in accordance with which various embodiments can be implemented. The system can include a control system 147 having an optimizer 105, a forecast module 125, a user input module 130, a plant database 135, and a plant controller 140. The system also includes a power plant 145.

The optimizer 105 can include a model component 110, a failure model component 120 and an EOH compensation model component 115. The optimizer 105 receives one or more inputs from a forecast module 125, a user input module 130, a plant controller 140 and from a plant database 135.

The system can include a forecast module 125 to provide load forecast for the power plant 145 over a period of time. The demand for the load keeps fluctuating and hence there is a desire for forecasting the load demand. The forecast module 125 may use user input data to provide forecast information or have dedicated forecast models based on statistical models or other techniques. One or more generators can be selected for operation based on the forecasted load demand. Furthermore, by switching off the generators based on the load demand, the operation cost of the power plant 145 can be minimized. The load demand forecasted can be further sent as an input to the optimizer 105 for scheduling the load of the power plant 145.

In addition to the above, the forecast module 125 can also be used to provide a predetermined maintenance schedule for one or more constituents of the power plant 145. The predetermined maintenance schedule, type of maintenance and the period/periodicity of the maintenance schedule of one or more constituents of the power plant 145 can be based on operator's experience or component manufacturer recommendations. The predetermined maintenance schedule over a period of time can be further sent as an input to the optimizer 105 for scheduling the maintenance of one or more constituents of the power plant 145.

The system can include the user input module 130 for receiving a plurality of user inputs to the optimizer 105. The plurality of user inputs can include, but is not limited to, a cost of fuel, an emission penalty, an equipment life cost, and a spare unit operating cost. The user inputs can be further sent as inputs to the optimizer 105.

The power plant 145 includes a plurality of units. Information related to the plurality of units of the power plant 145 and their operating conditions is stored in the plant database 135. An operating history, current status, manufacturing details and maintenance scheduling of the plurality of units of the power plant 145 can also be stored in the plant database 135. The information related to the plurality of units of the power plant 145 can be further sent as an input to the optimizer 105 through plant controller 140, for scheduling the load of the power plant 145.

The system can include the power plant 145. The power plant 145 receives the load and the maintenance schedule determined through plant controller 140, and the power plant 145 is operated based on the load determined by the optimizer 105.

Figure 2:
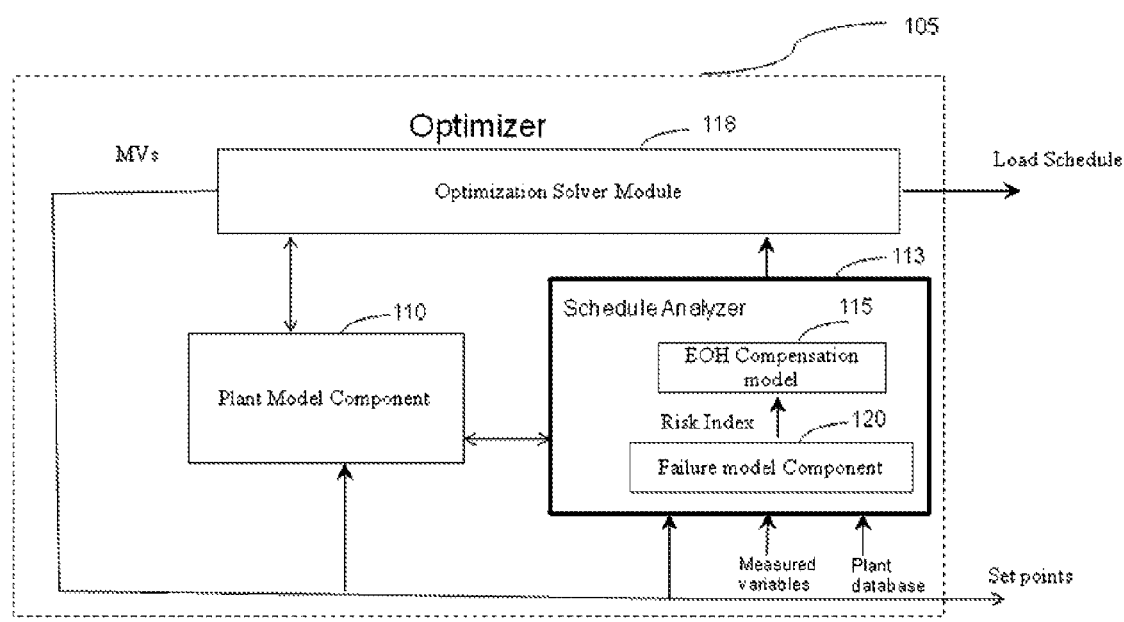
FIG. 2 is a block diagram of an optimizer for scheduling load of a power plant, in accordance with an exemplary embodiment.

FIG. 2 is a block diagram of an exemplary optimizer 105 for scheduling a load of a power plant 145, in accordance with an exemplary embodiment. The optimizer 105 includes a plant model component 110, schedule analyzer 113 and optimization solver module 118. Schedule analyzer 113 mentioned herein can comprise an EOH compensation model 115 and a failure model component 120. The schedule analyzer 113 through various plant parameters (e.g., measured variables, plant database) can analyze the factors as specified for solving the objective function providing load schedule (e.g., production/maintenance schedule) and the load values (set points) for one or more components of the one or more generation units. Collectively, the schedule analyzer can analyze the operating state (capability assessment of a particular generating unit to effectively perform its function with regard to both process and cost effectiveness). Here, the capability assessment can include risk assessment, demand assessment and based on risk assessment and demand assessment, also assess the need for maintenance including a suggestion of a schedule for maintenance. Further, the cost aspect referenced herein can relate to operational cost that includes maintenance cost.

A plurality of manipulated values (MVs) of load scheduling handled by the one or more units from can be fed as inputs to a plant model component 110 and the failure model component 120. Both plant model component 110 and a failure model component 120 also receive one or more inputs from the power plant 145 through plant controller 140, a plant database 135, a forecast module 125 and a user input module 130.

The optimizer component 105 can have an optimization solver module 118 that can be used to find an optimal load schedule for the power plant 145, by the minimization of an objective/estimation function of the power plant 145 responsive to receiving the one or more inputs. The objective/estimation function to be minimized by the optimization module 118 of optimizer 105 includes a penalty cost for not meeting the demands, an operating cost due to fuel consumption, a start-up cost, a shutdown cost, an aging cost, an emission cost and a maintenance cost. The optimization solver module 118 can use the well known max-min optimization technique for finding optimal load and maintenance schedules for the power plant 145. During an iterative process of minimizing the objective/estimation function, the optimization module 118 of optimizer component 105 can use a model component 110 and a failure model component 120 of one or more constituents of the power plant 145. This optimization process can continue until the optimization module finds the optimal load schedule for which the value of objective function is minimized.

The exemplary failure model component 120 receives the manipulated values and the inputs from the plant database 135 (the database has both present values and history information related to plant parameters as required for computations by the failure model component). The failure model component 120 then calculates a risk index of at least one of the constituents of the power plant 145 based on the manipulated values and one or more inputs received from the plant database 135. The risk index values for one more constituents of the power plant are then passed from the failure model component 120 to the EOH compensation model 115. The EOH compensation model 115 has cost factors associated with each risk index value of one or more constituents of the power plant 145. The optimizer 105 determines the load and the maintenance schedules based on the cost factors associated with calculated risk index values and operates the power plant 145 (e.g., loads the power plant) to meet the demand in the best possible manner.

Figure 3:
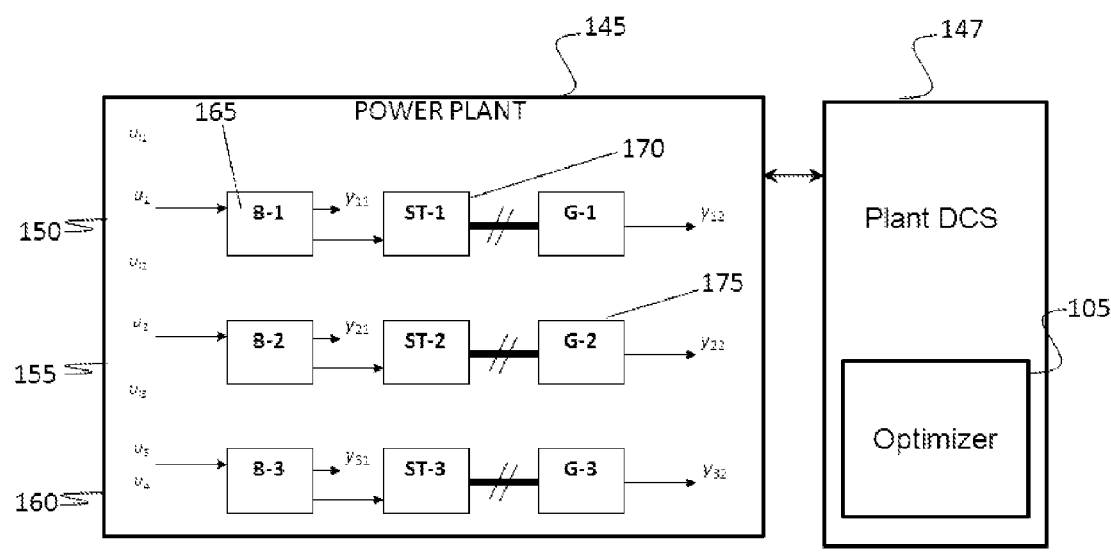
FIG. 3 is a block diagram of a simplified generic fossil fired power plant (FFPP), in accordance with an exemplary embodiment.

FIG. 3 is a block diagram representation of an exemplary, simplified generic fossil fired power plant (FFPP) 145 that is controlled by a control system 147 that includes an optimizer 105 to calculate the optimal solution for operating the power plant. The FFPP can include (e.g., consist of) three FFPP units 150, 155, 160 running in parallel. Each FFPP unit has three main pieces of equipment namely, a boiler (B) 165, a steam turbine (ST) 170 and an electrical generator (G) 175, the steam turbine being mechanically coupled with the electrical generator (G) 175. Under operation, steam loads, referred to as manipulated variables $u_1$, $u_2$ and $u_3$ are applied to the respective boiler to generate the output in the form of steam, expressed as $y_{11}$, $y_{21}$, $y_{31}$ that is given to the steam turbine combined with the electrical generator for electrical power generation. The electrical power output from the generator is expressed as $y_{12}$, $y_{22}$, $y_{32}$.

The control system 147 is used to monitor and control the different operating parameters of the power plant 145 to ensure the power plant is operated at optimum conditions. For optimal running of the power plant, as explained earlier, an exemplary important aspect is the optimal load scheduling between the different FFPP units, and the calculation for the optimized solution is done at the optimizer 105.

In an exemplary embodiment, the objective of load scheduling optimization is to meet the power demand by scheduling the load among the three FFPP units, subject to different constraints such as the minimization of the fuel cost, start up cost, running cost, emission cost and life time cost. The optimizer 105 receives inputs from the power plant, and applies optimization techniques for the optimal load scheduling. Based on the optimal solution, the control system 147 sends commands to different actuators in the power plant 145 to control the process parameters.

The objective function used for optimization can be as follows:

$$\text{minimize } (J) = C_{dem} + C_{fuel} + C_{start,shut} + C_{emission} + C_{life} + C_{maintenance} - C_{revenue}$$

$C_{dem}$ is a penalty function for not meeting electric demands over a period of time termed as prediction horizon.

$$C_{dem} = \sum_{t=T}^{T+M-dt} k_{demElec} \left| \sum_{i=1}^{n} y_{i2}(t) - D_{demElec}(t) \right|$$

where, $k_{dem\ Elec}(t)$ is a suitable weight coefficient and $D_{dem\ Elec}(t)$, for $t = T, \ldots, T+M-dt$ is a forecast of the load demand within the prediction horizon.

M, $y_{i2}$ is electrical power generated by all the 'n' units. With reference to FIG. 3, n=3.

$C_{fuel}$ is the cost for fuel consumption represented in a model for FFPP by the outputs $y_{11}$, $y_{21}$, $y_{31}$, and thus the total cost for fuel consumption is given by:

$$C_{fuel} = \sum_{t=T}^{T+M-dt} \sum_{i=1}^{n} k_{i,fuel} y_{i1}(t)$$

$C_{emission}$ is the costs involved in reducing the pollutant emission ($NO_x$, $SO_x$, $CO_x$) produced by the power plant and is given by:

$$C_{emission} = \sum_{t=T}^{T+M-dt} \sum_{i=1}^{n} k_{i,emission} f(y_{i2}(t))$$

where $k_{i\ emission}$ represents positive weight coefficients and $f(y_{i2}(t))$ represents a (non-linear) functional relationship between the load and the emission production.

$C_{start,shut}$ is the cost function for starting/shutting of one or more constituents of the power plant and is given by:

$$C_{start,shut} = \sum_{t=T}^{T+M-2dt} \sum_{i=1}^{n} k_{i,start/shut} \max\{u_{li}(t+dt) - u_{li}(t), 0\}$$

where $k_{i,start/shut}$ represents positive weight coefficients, and $u_{li}$ are the integer states (On/Off) of the units.

$C_{life}$ describes asset depreciation due to loading effect and is defined as:

$$C_{i,life} = \sum_{i=1}^{n} \sum_{comp=1}^{NumComponents} LT^i_{comp,load}(t)$$

where the depreciation cost of each component is calculated as:

$$LT^i_{comp,load} = \left(\frac{Load}{Load_{base}}\right) * \frac{dt}{3600} * cost_{EOH,comp}$$

where, Load and $Load_{base}$ are the load, base load on each component of the power plant respectively. $cost_{EOH,comp}$ is the cost per EOH for a specific component of the power plant and dt is the sampling time.

$C_{maintenance}$, the cost of maintenance for one or more components of the power plants is defined as follows:

$$C_{maintenance} = C_{fixed} + C_{RiskIndex} + C_{maintenance\ shift}$$

where, $C_{fixed}$ is the sum of fixed maintenance costs for different components of the power plant.

$C_{maintenance}$ shift is the cost of depreciation of the component of power plant due to the shift in predetermined maintenance schedule. It is defined as follows:

$$C_{maintenance\ shift} = \sum_{i=1}^{n} \sum_{comp=1}^{NumComponents} LT^i_{comp,load}(\Delta t)$$

where, $$LT^i_{comp,load} = \left(\frac{Load}{Load_{base}}\right) * \Delta t * cost_{EOH,comp}$$

and $\Delta t$ is the shift in maintenance schedule from the predetermined schedule.

$C_{Risk\ Index}$ is the compensation cost corresponding to risk index value provided by the failure model.

$C_{revenue}$ is the term for revenues obtained by the sales of electrical energy.

$$C_{revenue} = \sum_{t=T}^{T+M-dt} \sum_{i=1}^{n} p_{i,Elec}(t) y_{i2}(t)$$

where, $P_{i,Elec}(t)$ is the cost coefficient for the electrical energy for sale.

An exemplary objective of the power plant is to maximize revenue and minimize maintenance and penalty costs. This directly depends on the time for active production (production schedule) and inversely to the maintenance time (maintenance schedule) when the production is stopped or not to its full capacity.

In an exemplary proposed formulation, operation of the plant activities including maintenance is based on actual operating conditions and is also capable of influencing the operating conditions for the production schedule and maintenance activities. The maintenance cost of one or more constituents of the power plant is thus determined based on the operating conditions using a failure model component and an EOH compensation model component.

The failure model component can, for example, be either based on first principle models (aging models) or probability models based on statistical distributions relating operating condition parameters (based on history/experimental data, the excepted life under defined operating conditions. Example: For electrical aging the electric stress value and the time of operation). The failure model component can include the measures for severity, occurrence and detection of failures for different operating conditions using the FMEA technique. The measures are in terms of scores (e.g., score between 0-10), derived from the state of the plant also categorized or coded in terms of scores derived from manipulated variables or data from the plant database. Severity measure is an estimate of how severe the production schedule will be affected by a failure. In an exemplary embodiment, severity is defined to depend on multiple factors and each of the factors may be summated and scaled by appropriate weight functions associated with each of the factors. Some examples of the factors are provided for obtaining a measure for Severity. These are:

a) the time of operation with respect to maintenance (e.g., Severity is assumed to be high if the component within a unit for which the severity information is being coded is already due for maintenance. The severity measure is medium if it is approaching the pre-defined or allotted schedule for maintenance and is low if it is fresh from maintenance. High, medium and low may have a corresponding numerical score associated with it). This factor can be automatically coded from the history information associated with the component obtained from the plant database;

b) impact on downtime due to failure, this factor may be coded again based on the critically associated with the component either based on the service history available in the plant database or based on the judgment of skilled persons associated with the component. If there is no impact (e.g., the functioning of the unit will not get impacted in any manner by failure of the component for any reasons including that there is a standby component that improves reliability), the score may be taken as low and depending on the impact associated with the unit becoming unavailable for production, the score is judged to be high or medium. The impact is pre-defined function associated with each component;

c) cost for replacement associated with the component of the plant may also be coded based on relative cost for replacement of various serviceable/replaceable components in the power plant;

d) complexity of failure and repair for various components in the plant units may also be coded based on the expertise specified to attend to the maintenance activity or/and based on the intricacies involved in the maintenance activities.

In another exemplary embodiment, the factors for Severity may be derived from categorization of region of operation for various components in the power plant. Here, the calculation of the risk index value is based on the priorities from the region of operation, their initial conditions and the depreciation rate associated with the MVs for each component of a power plant.

In an exemplary embodiment, three different operating regions for one or more constituents of a power plant in association with the manipulated variables can be defined. The regions of operation for one or more constituents of the power plant include a recoverable region, a replaceable region and a catastrophe region. Recoverable region is defined as a region where by suitably adjusting the operating conditions of units, the condition of the unit may be maintained in a manner that does not incur significant loss or any abrupt failure resulting in loss of service of the particular unit. This region is said to be with a low risk index value. Replaceable region defines a medium risk and denotes a condition wherein the unit or a major component in the unit is nearing its recommended maintenance period as pre-scribed by the manufacturer or as recommended based on the history information (experience) for its nominal functioning and on failure is likely to create a loss, though manageable from cost perspective, by a small disruption in service or by failures resulting in a replacement activity carried out in small time or manageable by activation of the spare unit. Catastrophe region defines a high risk value where it is not any more likely to have any benefit by delay in maintenance activity (e.g., any failure incurred either has huge impact in a production schedule or in maintenance cost). The operating region information are designated values by plant engineers as suitable by the design or specification of the component and the service or other history information available in the plant database. The risk levels are coded into the severity measure in the failure model component.

It is re-iterated that the various factors contributing to severity rating of the component may be summated and scaled appropriately depending on the role/importance of the component and various components in turn summated and scaled to represent the power plant unit.

Occurrence data can be associated with factors such as the probability of failure of a particular component in the power plant unit. The probability of failure can be further related to the operating conditions/state of the power plant components (e.g., probability of failure for every major component in the plant units based on the accumulated stress levels and the time of accumulation of these stresses). The probability value can also be coded as low, medium and high for various components, summated and scaled to represent for a power unit. Depending on the component that is at risk (medium or high probability value), the manipulated variables may be so adjusted by the optimizer to minimize the risk of having the component fail. Another factor that may be used is the frequency of occurrence of fault. If the component is prone to failures, the factor may be coded as "high" indicating high risk.

Detection is used to reflect how easy it is to detect the growth of a defect leading to a failure of the component in operation in the power plant unit. On having a good detection mechanism in place to monitor defect in the control system, the value may be coded as "low" indicating low risk associated with the component. The value may be high for defects that appear suddenly or have multiple modes or are not monitored (directly or indirectly). It is to be recognized that the defects or failure modes that are monitored, or are capable to be monitored, have low risk as these defects based on the knowledge of failure mode and fault tree are controllable by adjusting the operating conditions (controlled through manipulated variables). For the components, where the defects are non-observable or there are means to infer or estimate, the risk may be considered as "medium".

The failure model component calculates the risk index corresponding to the operating state (derived from plant database, manipulated variables (MVs) or measured variables) for each power plant units/components. The risk index value of one or more constituents of the power plant is taken into account for scheduling maintenance and has scores (value of risk index) categorized further as follows:
Lower Risk Index:

No need for maintenance schedule. The maintenance schedule may be allowed to be postponed if found justified based on cost or if the component vulnerable to failure is of the nature that can easily be replaced without affecting or with minimum affect to the plant. That is that the risk index does not affect the operation of the plant.

Medium Risk Index:

Maintenance schedule may be delayed and may be accommodated when the power plant component is idle or not scheduled for production schedule if such a schedule is anticipated in near future (within the prediction horizon) or if the risk index value is expected to become lower in the prediction horizon. However, alteration in operating conditions can be recommended to reduce the risk level or at the least maintain risk within manageable limits. E.g., the plant may be operated in reduced stress conditions (not to overload or operated below full capacity). The alteration in operating conditions may also be made to reduce the risk value from medium to low (e.g., have the plant/component of the plant under risk recover).

Higher Risk Index:

Maintenance schedule is compulsory. Immediately or shortly schedule for maintenance. Here, the component under risk is likely to fail at short notice and will severely affect operation of the plant or influence downtime significantly.

From this system, maintenance is scheduled based on the condition of the system and accounting for the overall benefit (cost function) considering the load demand forecast over the prediction horizon. For example, the optimization of the system decides when to go for maintenance. This is with reference to both risk index (indicative of the actual condition of the system) and operation/maintenance/penalty costs. If high risk is found, a new set of manipulated variables is provided as the optimizer tries to reduce the risk index, the associated EOH compensation and other costs (aging, maintenance) going high.

The calculated risk index values for one more constituents of the power plant 145 by the failure model component 120 is passed to the EOH compensation model 115. The EOH compensation model 115 can provide the corresponding EOH compensation cost factors associated with each category of risk index values (high/medium/low) of one or more constituents of the power plant 145. The EOH compensation model is based on lookup tables (eg. Table 1) for each component of the power plant which defines the EOH compensation values and the cost per EOH corresponding to each category of risk index value.

As an example, the use of an EOH compensation model is illustrated for a boiler component in a power plant. Consider a following table to represent risk index values and the associated EOH compensation. The cost factor associated with the risk index is calculated as:

$$C_{RiskIndex} = \text{EOH Compensation} * \text{cost}_{EOH,comp}$$

TABLE 1

Coding for EOH compensation

| Risk Index Range | Risk Category | EOH Compensation |
| --- | --- | --- |
| (0-0.4) | Low risk | 5 |
| (0.4-0.7) | Medium risk | 10 |
| (0.7-1.0) | High risk | 50 |

For example, if a boiler of a power plant operating with a high risk value of 0.8 and the $\text{Cost}_{EOH}$=100$ (say), then the cost factor associated is calculated as, $C_{RiskIndex}$=50*100=5000$. This cost factor will be added into the objective function J. In the process of minimizing the objective function (J), the optimizer component tries to avoid such cost factors associated with the high risk index values, by scheduling maintenance activities for such components in the power plant.

In finding the optimal load scheduling of the power plant, an exemplary optimizer can be configured to always try to operate the units in less severe conditions/recoverable region. If a unit falls under the replaceable region, the optimizer can try to reduce the manipulated variable values in order to reduce the risk value from medium to low. Similarly, in any case, if any unit falls under the catastrophe region, the optimizer can try to schedule the maintenance for the corresponding unit if in near future it is not foreseen to reduce risk level. The schedule analyzer can use the plant model to help in simulating the plant condition in the prediction horizon to find if the risk is expected to come down within the prediction horizon.

Further the initial starting points (e.g., the service information related to accumulated stress and time of application of these stresses) for the defined operating regions are derived from the power plant operation history.

Depreciation/Aging of the equipment of a power plant can be closely associated with the operating conditions of the power plant. As said, the manipulated variables are related with the probability of failure value (coded suitably to obtain an Occurrence score in the Failure model) and also in calculation of the depreciate rate. For e.g., the rate of depreciation increases if the equipment is heavily loaded. With reference to the severity rating, the value of depreciation rate also varies. A delay in predetermined maintenance schedule, may lead to increased depreciation rate and the associated cost factors. But at the same time, if there is any useful tradeoff by setting the manipulated variables in such a manner so to accomplish delayed maintenance by managing a depreciation rate from the time of such setting until the period after the predetermined maintenance schedule, the optimizer is likely to operate the plant then with such a setting for the manipulated variable. In such cases, the maintenance schedules can be delayed and the unit can be scheduled for production with loads as recommended by the optimizer for overall benefit.

In an exemplary embodiment, the maintenance activity is scheduled as defined in the lookup table (Table 2) based on the risk levels and the load forecast. The column load forecast has relative codified information where the load requirement based on the forecast is categorized as "Low" when the load requirements are easily met by other units. The load forecast value is "Medium" when the load requirements are met by other units under low loss, by maintaining at nominal levels or by a slight increasing in the output of the unit beyond nominal levels. The load forecast value is "High" when the load requirements cannot be met without participation of the unit in question for maintenance (the penalty values are high).

As an initial condition, the predetermined maintenance schedule for one or more constituents of the power plant (say, after every period of $T_m$, maintenance of a particular component of the power plant has to be scheduled) is obtained from the forecast module and used by the optimizer as initial conditions for scheduling maintenance activities. At any time t, the time for next maintenance is $(T_m-t)$.

The system can optimize a load schedule in the prediction horizon based on capability assessment, operational cost assessment and shifts in maintenance schedule. The risk levels and the EOH compensations are considered. If at the time $(T_m-t)$, the risk index value is acceptable for production scheduling, the unit is scheduled for production. In case the risk level is such that it suggests maintenance to be scheduled, the system tests for improvement by suitably changing the manipulated variables to create a condition where the risk level is expected to improve. The system may also adopt simulation as a means for test for improvement using plant model component.

If at the simulation test or at the test in time ($\Delta t$) with new manipulated variables, the forecasted or actual risk index value is still high (no significant reduction in risk index value), the system can prompt/force the component/unit to go into maintenance within the preconfigured time (e.g., ramp down $+\Delta T$, where $\Delta T$ is the reaction time to have the other units adjusted or have the specified consents from operators).

If during the improvement test, the forecasted or actual risk value is getting reduced (significant improvement in the system) from running the plant with the new manipulated variables (MVs), then the maintenance may not be carried out at ($T_m$-t) and the new maintenance schedule of $T_m+m\Delta t$ is recorded in the forecast module.

It is to be recognized that the simulation activity is optional and the optimizer in an exemplary embodiment may be described without the simulation test to assess improvement. However, at a minimum, there may be sufficient analysis to indicate there is cost benefit by altering the maintenance schedule and these analyses may be done by the schedule analyzer. Further, the schedule analyzer may also be used to indicate an optimal shift instead of postponement by $m\Delta t$ for a maintenance schedule only on the cost basis using well known procedures such as that provided in U.S. Pat. No. 6,999,829, the entire content of which is hereby incorporated by reference in its entirety, including having an objective function based on cost to optimally determine the shift desired in the maintenance schedule.

It is also to be noted that with postponement of a maintenance schedule, the objective function can consider a higher value of depreciation cost until the time the maintenance is carried out. This factor is added as additional term in the objective function as a part that accounts for maintenance cost.

Figure 4:
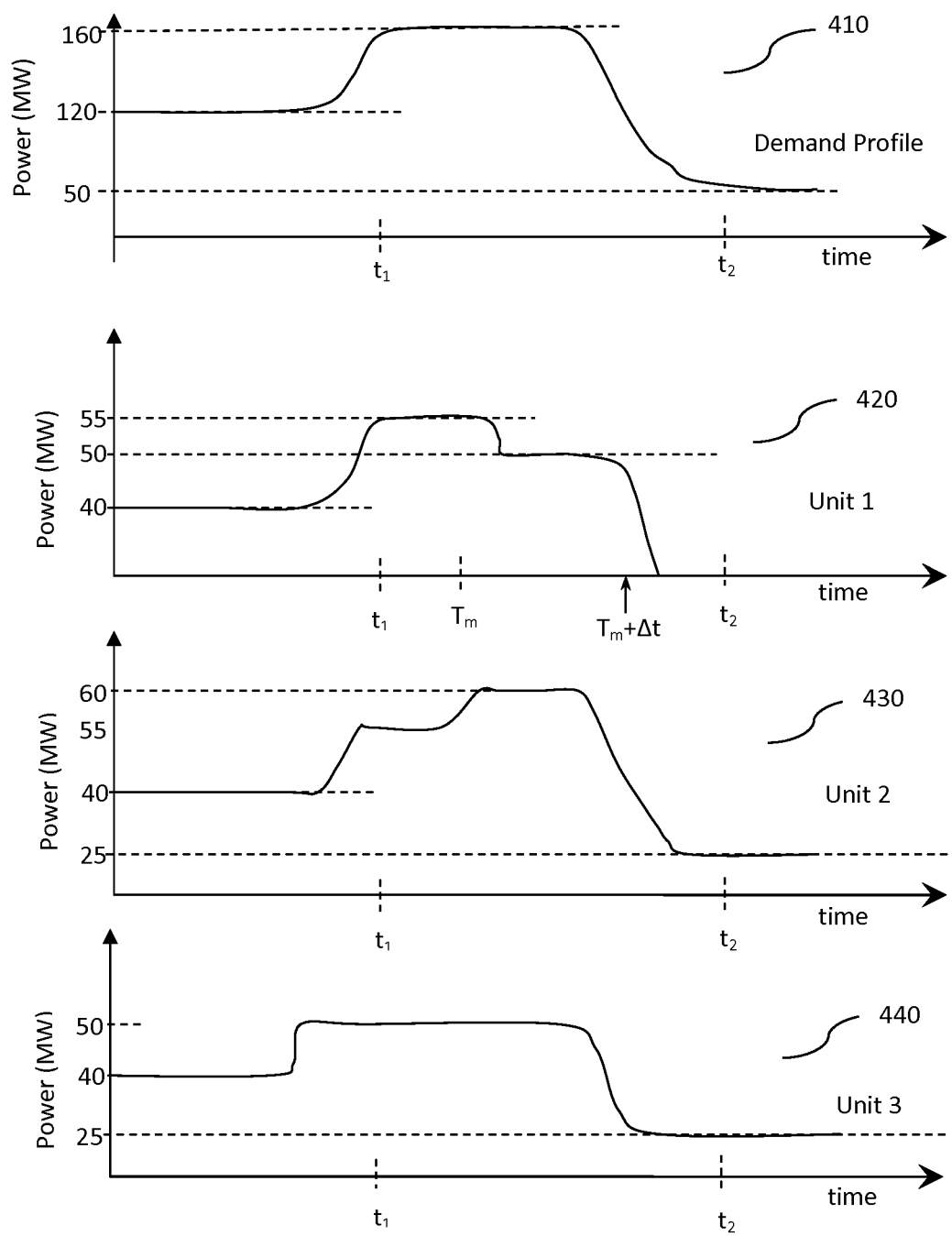
FIG. 4 shows an exemplary demand forecast profile.

An exemplary method of optimization can be explained briefly with an example below with reference to FIG. 3. Let us assume the units 1, 2 and 3 are identical. Consider that the maximum load carrying capacity of units 1, 2 and 3 are 60 MW, 60 MW and 50 MW respectively. An exemplary demand forecast profile is assumed to demonstrate the optimal schedule of both production and maintenance activities over the prediction horizon as shown in FIG. 4.

All the three units (Unit 1, 2, 3) are optimally scheduled to produce 40 MW each, to meet the total demand of 120 MW until time $t_1$. After time $t_1$, the demand profile changes to 160 MW as inferred from 410 of FIG. 4. Since the maximum load carrying capacity of Unit 3 is only 50 MW, as inferred from 440, it is scheduled by the optimizer to produce 50 MW. A remaining 110 MW is shared among units 1 and 2.

From 420 it is seen that, between time $t_1$ to $t_2$, there exists a predetermined maintenance trigger for Unit 1, denoted as $T_m$. The schedule analyzer and the optimization solver module estimates and takes into account various factors associated with load scheduling/maintenance scheduling of Unit 1. In this example, at the point around $T_m$ the risk index for Unit 1 is medium. The medium risk value for risk index and high demand suggests an immediate need for reduction of risk and at the same time meet the demand. In this example, for Unit 1, the optimizer is shown to time up with a value of 50 MW as the load that is optimal cost wise and may reduce the risk. A new set point to reduce risk is sent for Unit 1 corresponding to 50 MW. To meet the demand and to have Unit 1 function at 50 MW, Unit 2 is scheduled to ramp up from 55 MW to 60 MW as inferred from 430. The optimizer checks for improvement in $\Delta t$ within the prediction horizon and it finds that the risk on Unit 1 indeed reduces to low with $\Delta t$ in the prediction horizon. Hence, the maintenance activities of Unit 1 are postponed to $T_m+\Delta t$. The optimizer records the suitable time for maintenance schedule for Unit 1 as $T_m+\Delta t$, where the $\Delta t$ is the time within the prediction horizon and shift in maintenance schedule from $T_m$.

The demand forecast goes down just after the schedule $T_m+\Delta t$ and the demand is low enough to be met by Unit 2 and Unit 3. As the demand is low and even though the risk index of Unit 1 is low, Unit 1 is taken for maintenance at $T_m+\Delta t$. At time t2, Units 2 and 3 are scheduled to take care of the total demand of 50 MW.

TABLE 2

Maintenance activity scheduling based on Risk Index and Demand Forecast

| Risk Index | Demand Forecast | Maintenance Activities |
| --- | --- | --- |
| High | Low | Schedule |
| Medium | Low | Schedule |
| Low | Low | Schedule |
| High | Medium | Check for improvement in $\Delta t$ ($T_m$ is the max value) if no improvement then Schedule |
| Medium | Medium | Check for improvement in $\Delta t$ ($T_m$ is the max value) if no improvement then Schedule |
| Low | Medium | No schedule, Postpone $T_m$ by ($T_m + m\Delta t$) |
| High | High | Check for improvement in $\Delta t$ ($T_m$ is the max value) if no improvement then Schedule |
| Medium | High | Check for improvement in $\Delta t$ ($T_m$ is the max value) if no improvement then Schedule |
| Low | High | No schedule, Postpone $T_m$ by ($T_m + m\Delta t$) |

$T_m$ is the schedule for maintenance; "m" is a predetermined number; and $\Delta t$ is time within the prediction horizon.

Figure 5:
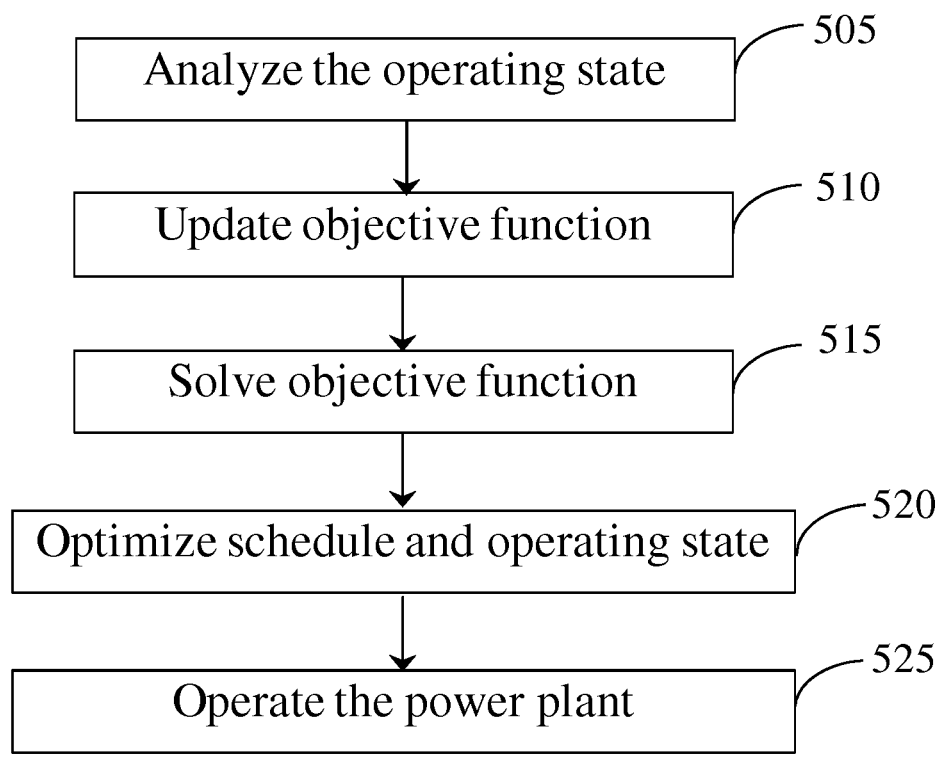
FIG. 5 illustrates an exemplary method for scheduling a load of a power plant.

FIG. 5 illustrates an exemplary method for optimizing load scheduling for a power plant in accordance with an embodiment disclosed herein. The power plant herein referenced has one or more generation units having one or more components thereof.

Optimizing load scheduling here includes production scheduling, maintenance scheduling or load for the generation units and the like. It also includes optimizing the risk indices for the components of the generation units, which can be done by changing the manipulated variables as described herein above. Optimizing load scheduling can also include postponing or advancing the maintenance trigger for maintenance of the components of the generation units which is based on the load demand or the state of the component.

Step 505, refers to analyzing the operating state of the components of the generation unit. The generation units have one or more risk indices associated with one or more components of generation units. The step of analyzing includes capability assessment, operation cost assessment and shifts in maintenance schedule therein within the prediction horizon.

Step 510, involves updating the objective function that reflects the state of one or more components of the generation units. The objective function herein mentioned includes at least one term for process control of the components and at least one term associated with maintenance of the components. Also, the step of updating the objective function includes updating with respect to the cost associated with postponing or advancing the maintenance of the components of the generation units or with the cost associated with the lifecycle of the components taking into account the depreciation or degradation of the components therein.

In step 515, the objective function is solved, in order to optimize the schedule of the generation units operating state of the components of the generation units, as depicted in step 520.

Step 525 refers to the step of operating the power plant. This has reference to operating the generation units at an optimized schedule and operating state thereof.

It should also be noted that the control system offers means to allow an operator/user to override load scheduling (e.g., maintenance schedule) or operating state by inputs through a suitable user interface directly by specifying a particular schedule or operating state for one or more components of the generation units in a power plant or indirectly by manipulating the certain parameters/variables related with schedule analyzer or forecast module.

While only certain features of the invention have been illustrated and described herein, many modifications and changes will occur to those skilled in the art. It is, therefore, to be understood that the appended claims are intended to cover all such modifications and changes as fall within the true spirit of the invention.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for optimizing load scheduling and operating state for a power plant having one or more generation units with a control system that monitors and controls the power plant and comprises an optimizer, the method comprising:
   calculating one or more risk indices for one or more components of the one or more generation units derived from manipulated variables of the one or more generation units for analyzing an operating state of the one or more components of the one or more generation units, wherein the one or more risk indices are associated with the one or more components of the one or more generation units;
   updating at least one objective function that reflects the analyzed operating state of the one or more components of the one or more generation units, wherein the at least one objective function includes at least one term for process control of the one or more components of the one or more generation units and at least one term associated with maintenance of the one or more components of the one or more generation units;
   obtaining an optimized load schedule for the one or more components of the one or more generation units by solving the at least one objective function, wherein obtaining the optimized load schedule includes obtaining an optimized maintenance schedule, optimized load values, and optimized risk indices to optimize the operating state of at least one of the one or more components of the one or more generation units; and
   controlling process parameters of the power plant including adjusting load values by providing set points of manipulated variables for the one or more generation units to operate the one or more generation units at the optimized load schedule and the optimized operating state.

2. The method as claimed in claim 1, wherein the step of analyzing the operating state comprises:
   analyzing at least one of a capability assessment of the one or more generation units to effectively function, an operational cost assessment, and shifts in maintenance schedule in a prediction horizon.

3. The method as claimed in claim 1, wherein optimizing the load schedule includes at least one of production scheduling, maintenance scheduling, and load values for the one or more generation units.

4. The method as claimed in claim 1, further comprising:
   optimizing the one or more risk indices for the one or more components of the one or more generation units by changing the manipulated variables to adjust the operating state and load schedule.

5. The method as claimed in claim 1, further comprising:
   postponing or advancing a maintenance trigger for maintenance of the one or more components of the one or more generation units based on a state of a component and a load demand.

6. The method as claimed in claim 1, wherein the updating comprises:
   updating the at least one objective function with (a) cost associated with postponing or advancing maintenance of the one or more components of the one or more generation units, and (b) cost associated with lifecycle of the one or more components of the one or more generation units.

7. A control system for load scheduling and operating a power plant having one or more generation units, the control system comprising:
   a plant controller to control processes of the one or more generation units; and
   an optimizer having at least one objective function that includes at least one term for optimizing load scheduling which includes maintenance scheduling and risk indices derived from manipulated variables of one or more components of the one or more generation units and at least one term for optimizing process control of the one or more generation units in the at least one objective function, wherein the optimizer utilizes a plant model component and a failure model component for load scheduling optimization, and wherein the optimizer comprises:
      a schedule analyzer for acquiring at least one of manipulated variables, measured variables, and data from a plant database, and analyzing an operating state of the one or more components of the one or more generation units by calculating one or more risk indices associated with the one or more components of generation units from the at least one of manipulated variables, measured variables, and data from the plant database, and
      an optimization solver configured to determine an optimal maintenance schedule and load values for the one or more components of the one or more generation units by solving the at least one objective function for providing set points to the plant controller for operating the one or more components of the one or more generation units at an optimized load schedule and an optimized operating state.

8. The system as claimed in claim 7, wherein maintenance of the one or more generation units is effected by a maintenance trigger based on the risk indices of the one or more components of the one or more generation units, demand forecast, and improvements in the operating state affected by the manipulated variables.

9. The system as claimed in claim 7, wherein the optimizer receives the manipulated variables to calculate the one or more risk indices associated with the one or more components of the one or more generation units to optimize the maintenance schedule and load values.

* * * * *